US008042588B2

(12) United States Patent
Robinson et al.

(10) Patent No.: US 8,042,588 B2
(45) Date of Patent: Oct. 25, 2011

(54) MULTI TIME AND INDEX HEAT PRESS

(75) Inventors: Benjamin B. Robinson, Smithfield, PA (US); George C. Tichnell, Jr., Ponce Inlet, FL (US)

(73) Assignee: Stahls' Inc., St. Clair Shores, MI (US)

( * ) Notice: Subject to any disclaimer, the term of this patent is extended or adjusted under 35 U.S.C. 154(b) by 304 days.

(21) Appl. No.: 12/415,615

(22) Filed: Mar. 31, 2009

(65) Prior Publication Data

US 2009/0242096 A1 Oct. 1, 2009

Related U.S. Application Data

(60) Provisional application No. 61/040,992, filed on Mar. 31, 2008.

(51) Int. Cl.
*B32B 37/00* (2006.01)

(52) U.S. Cl. ........ 156/358; 156/359; 156/366; 156/378; 156/579; 156/583.1; 156/583.8

(58) Field of Classification Search .................. 156/228, 156/358, 359, 366, 378, 579, 580, 583.1, 156/583.8, 583.9; 100/315, 233
See application file for complete search history.

(56) References Cited

U.S. PATENT DOCUMENTS

| | | | | | |
|---|---|---|---|---|---|
| 4,004,503 | A | * | 1/1977 | Dwyer | 101/9 |
| 5,252,171 | A | * | 10/1993 | Anderson et al. | 156/358 |
| 5,435,883 | A | * | 7/1995 | Myers | 156/583.9 |
| 5,474,633 | A | * | 12/1995 | Myers | 156/230 |
| 6,058,834 | A | * | 5/2000 | Beckwith | 100/99 |
| 6,151,814 | A | * | 11/2000 | Raio et al. | 38/30 |

* cited by examiner

*Primary Examiner* — James Sells
(74) *Attorney, Agent, or Firm* — Rader, Fishman & Grauer PLLC

(57) ABSTRACT

A press is described having an upper platen. The press includes a support arm adapted to selectively move the upper platen between an open position, a partially open position and a closed position with respect to a lower platen. An electromagnet is disposed proximate the support arm and configured to selectively secure the upper platen in the closed position. Another electromagnet, which may be disposed proximate a base member, is configured selectively to secure the upper platen in a partially open position.

16 Claims, 8 Drawing Sheets

MULTI TIME AND INDEX HEAT PRESS

TECHNICAL FIELD

The embodiments described herein are generally directed to a heat transfer press.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. New developments in the construction and composition of lettering have resulted in high quality transfers that can be accurately and quickly transferred to the apparel without bleeding or partial interruptions in the bonding of the transfer, as long as the presses can be operated at a predetermined temperature for a predetermined time and at a predetermined pressure. Nevertheless, heat applied transfer presses must be simple, manually operated devices in order to satisfy the user's need to economically but quickly apply various lettering, symbols and numbering indicia selected by a customer and which must be applied to a selected piece of apparel. Such an apparatus must accommodate many variations in the arrangement of transfers and apparel, as well as the types of transfers and apparel materials available.

The accuracy and precision of the temperature, the pressure and the time duration for which these parameters are applied to the transfers are particularly important to complete an efficient bonding of the transfers to materials. In particular, depending upon materials and the structure of the indicia to be applied to the apparel, indicia may be subject to inconsistent application conditions throughout the surface of apparel to which the transfer is applied. For example, excessive temperature may cause the ink or adhesive to bleed into the apparel material so that the indicia becomes discolored or a blend of different colors thus changing the original appearance of the indicia intended to be applied. Likewise, the application of excessive pressure may cause bleeding of the colors while insufficient pressure between the platen pressing surfaces may result in blotched or unattached areas where the indicia failed to adhere completely to the garment. Additionally, some indicia or apparel may require pre-curing at lower or higher temperatures or pressures or some combination of temperatures and pressures.

Although some means are known to provide improved image results on various substrates, they tend to be difficult to use, time consuming and labor intensive. As in most businesses, since the applying, forming, fixing, etc. of images on substrates is becoming more competitive, it is becoming increasingly more important to be able to form high quality images on various substrates, using different processes, in a more efficient, more controlled, inexpensive, less-time consuming manner.

Thermal or heat transfer presses are known for applying graphic images on textiles or other similar substrates, or to press foil onto a substrate. However, when used to form high definition graphic images, this process tends to be very slow, time consuming and difficult to use, and overall, too expensive. Therefore, there exists a need in the art to provide an improved and automated device for forming better resolution in graphic images, thereby providing high definition images on various substrates. For example, a device that forms a smoother surface on a substrate will provide better print resolution and a smoother feel to a printed garment.

SUMMARY

In the embodiments described, a press is employed having an upper platen. The press includes a support arm adapted to selectively move the upper platen between an open and a closed position or a position between. An electromagnet is disposed proximate the support arm and configured to selectively secure the upper platen in the closed position. Another electromagnet may be disposed proximate a support base and configured to selectively secure the upper platen in a partially-open hover position.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
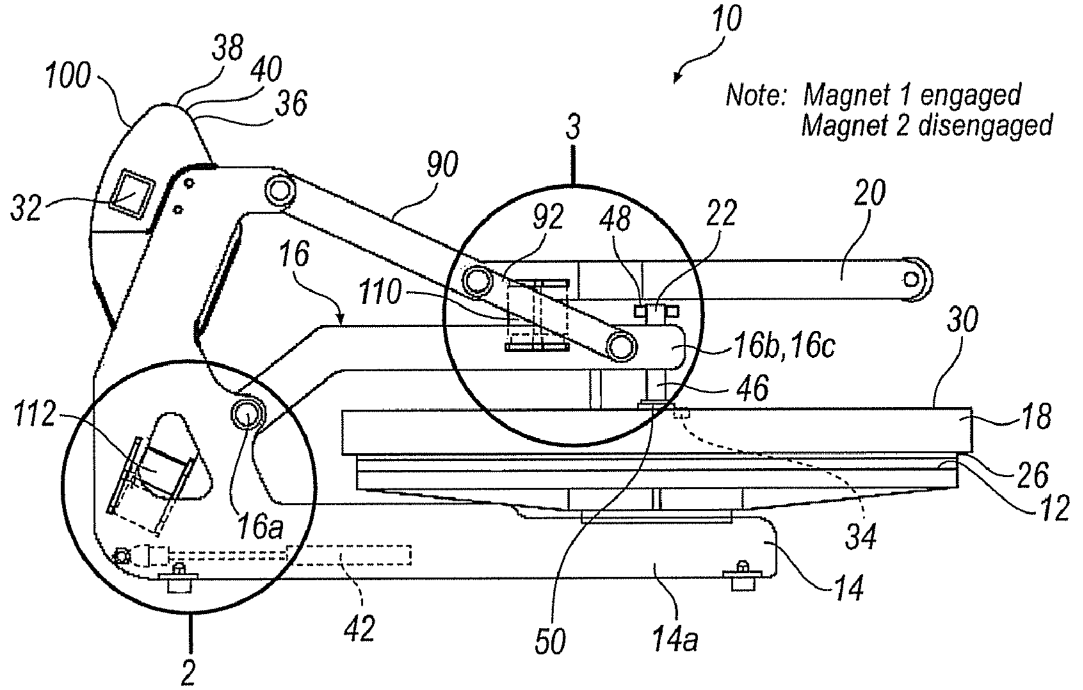
FIG. 1 is a side elevational view of an embodiment of a transfer press in a closed position.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

The term "platen" as used throughout the specification is defined hereinafter to include but is not limited to: a work structure of a machine tool and a generally flat plate of a press that presses a material. The term "pivot" or any variation thereof such as "pivotally" as used throughout the specification is defined hereinafter to include but is not limited to: a rod or shaft on which a related part rotates or swings; the act of turning on or as if on a pivot; to cause to rotate, revolve, or turn; and to mount on, attach by, or provide with a pivot or pivots. The term "electromagnet" as used throughout the specification is defined hereinafter to include but is not limited to: a magnet having a coil of insulated wire wrapped around a metallic core that is magnetized when current flows through the wire; a core of magnetic material surrounded by a coil of wire through which an electric current is passed to magnetize the core; an artificial magnet, produced by the action of a voltaic or electrical battery; and a magnet used for producing and maintaining a magnetic field. The term "heating element" as used throughout the specification is defined hereinafter to include but is not limited to: a component that transforms fuel or electricity into heat. The term "gas spring" as used throughout the specification is defined hereinafter to include but is not limited to: an actuating force; a component placed in mechanical compression or extension; and a component providing a compression or extension force.

Referring first to FIG. 1, a side elevational view of an embodiment of a heat applied transfer press 10 in a closed position is shown. The heat applied transfer press 10 includes a lower platen 12 mounted on a base frame 14. A support arm 16 is pivotally secured to the base frame 14 at a pivot mechanism 16A to support an upper platen 18 in a manner to be described in greater detail below. The mechanism for displacing the upper platen 18 includes an operating arm 20 accessible to a press worker for manually displacing the upper platen 18 by the pivot mechanism 16A between an open and the closed position or a position between with respect to the lower platen 12. The upper platen 18 is generally aligned with the lower platen 12 as the upper platen 18 approaches the closed position by having the support arm 16 secured to the base frame 14 at the pivot mechanism 16A. In addition, an adjuster 22 controls the spacing between the upper platen 18 and the lower platen 12 surfaces in the closed position. Accordingly, the press 10 may include platen pads such as an insulating pad 26 for accommodating surface irregularities occurring on the material to be worked on or on the heat applied transfers to be inserted between the platens 18 and 12 for application to the material including apparel.

As also shown in FIG. 1, at least one platen, and preferably the upper platen 18 includes a heating element 30 such as conventional resistive heating elements and the like, which may be formed as serpentine or otherwise wound throughout the surface area of the platen 18. The heating element 30 is coupled to a typical power supply through a switch 32 and may be configured for adjusting the temperature of the heating element 30. Further, the temperature of the heating element 30 may be adjusted at a visual display 36. In addition, the upper platen 18 carries a thermocouple sensor 34 which is wired in a conventional manner to generate temperature information at the visual display 36. The visual display 36 is mounted for exposure to the area occupied by the press operator positioned for manipulating and controlling the operating arm 20. The electrical circuit for the heating element 30 includes a temperature control such as a thermostat 38. In addition, a timer control 40 provides a perceptible indication to the worker manipulating the operating arm 20. Although a simple mechanical spring type timer may be used, an automatic timing system utilizing an automatic proximity sensor and digital display counter in the visual display 36 as described in greater detail below may be used.

Figure 2:
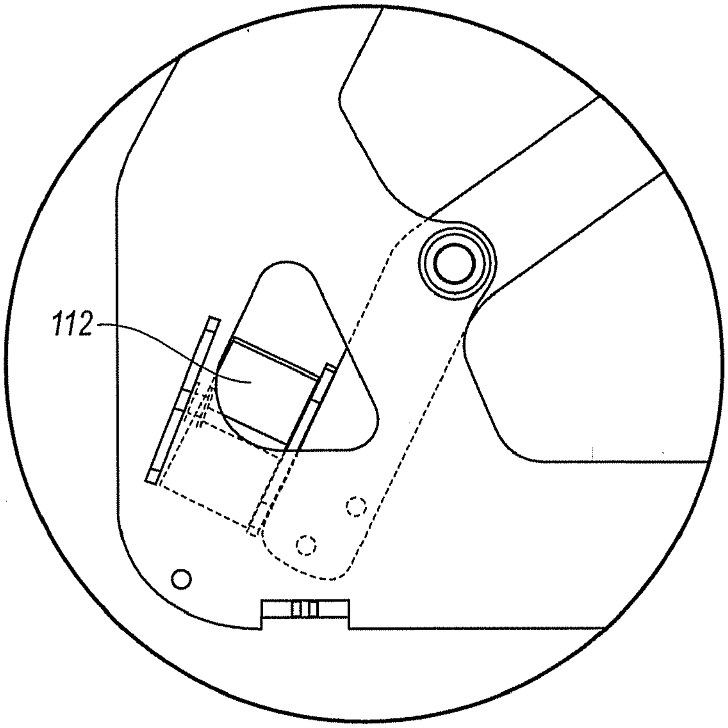
FIG. 2 is an exploded view of part of the device of FIG. 1 showing one embodiment of placement of an electromagnet.
Figure 3:
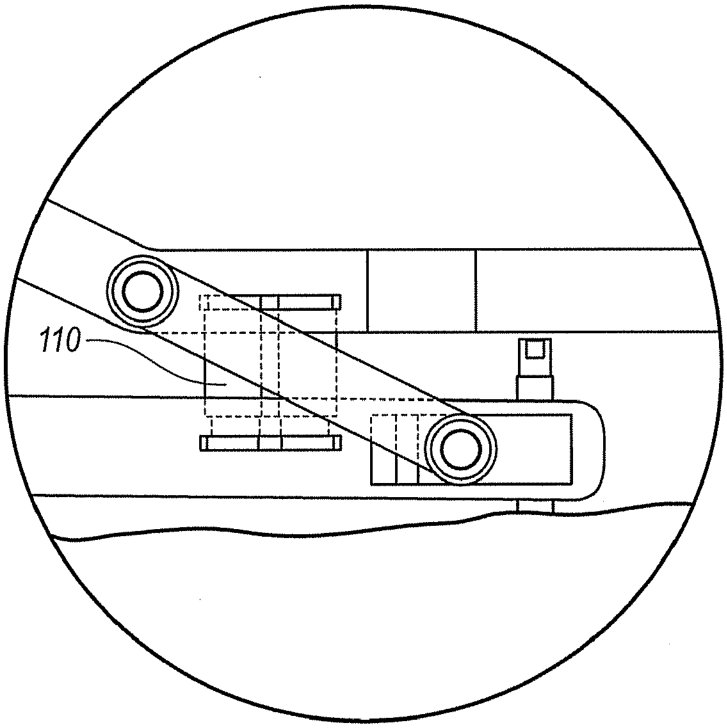
FIG. 3 is an exploded view of part of the device of FIG. 1 showing one embodiment of placement of an electromagnet.

As also shown in FIGS. 2 and 3, one embodiment of the transfer press 10 includes two electromagnets 110 and 112 which are selectively activated to hold the upper platen 18 in predefined positions.

Figure 4:
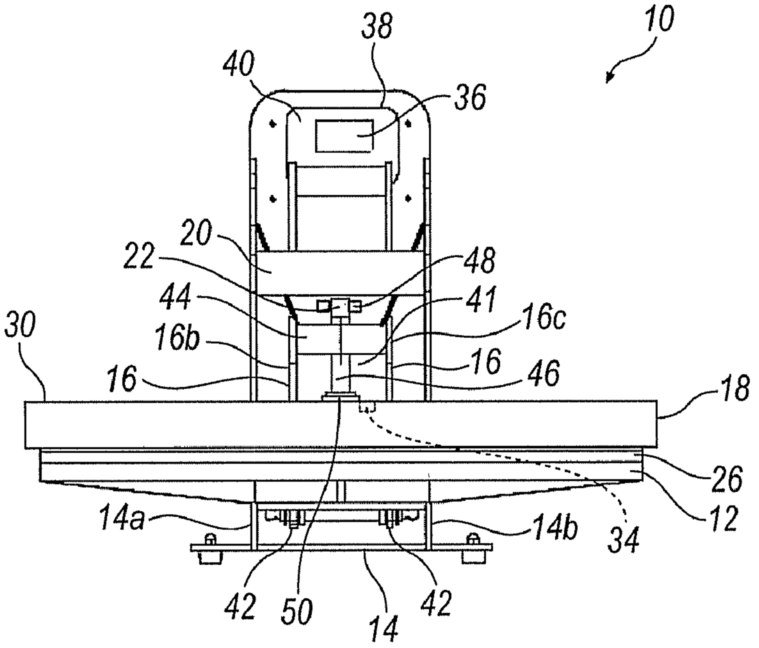
FIG. 4 is a front elevational view of the transfer press in FIG. 1.

As also shown in FIGS. 1 and 4, the support arm 16 includes an opening 41 for receiving a pair of gas springs 42 between a first base leg 14A and a second base leg 14B of the base frame 14. The other ends of the gas springs 42 are similarly constructed to engage in openings in the base frame 14. The gas springs 42 are under constant compression providing a generally constant push biasing the upper platen 18 into the open position. The gas springs 42 provide a predetermined biasing force that requires the press operator to push in a downward direction. By way of example, in one embodiment, approximately seven pounds of force in a downward direction on the operating arm 20 places the transfer press 10 in the closed position. As shown in FIG. 4, the support arm 16 includes a carrier 44 between a first leg 16B and a second leg 16C. The carrier 44 is fixed to the support arm by welding and the like.

Figure 5:
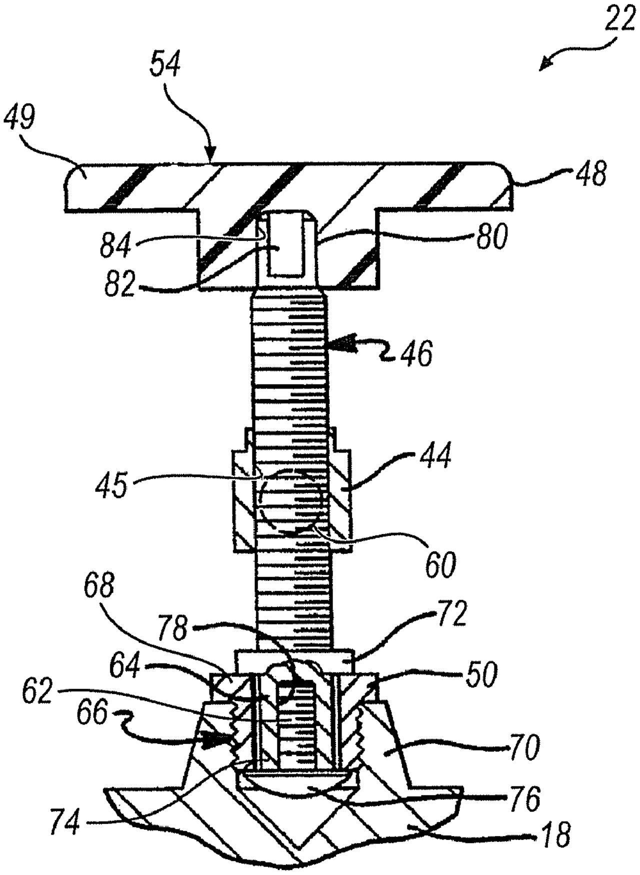
FIG. 5 is a cross-sectional view of one embodiment of an adjuster as shown in FIG. 1.

As also shown in FIGS. 1, 2 and 5, the adjuster 22 includes a threaded aperture 45 in the carrier 44 adapted to receive a correspondingly threaded rod 46 so that the rod 46 extends through the carrier 44 and is controlled in an upward and downward direction relative to the carrier 44 by an actuating member 48 located at an upper end of the rod 46. The threaded engagement between the rod 46 and the carrier 44 permits adjustment of the longitudinal disposition of the rod 46 extending through the carrier 44, but securely holds the rod 46 with respect to the arm 16. The lower end of the rod 46 is coupled to the upper platen 18 by a connector, for example a swivel connector 50, that permits a floating platen support to equalize pressure across the facing platen surfaces despite disparity in the thickness of transfers and apparel portions positioned between the platens 12, 18. The actuating member 48 at the upper end of the rod 46 includes a grip 49 for adjusting the position of the rod 46 within the threaded aperture in the carrier 44. It is also contemplated that in another embodiment, the adjuster 22 is any known adjustable device adapted to accommodate the extending rod 46 through a throughbore while maintaining the rod 46 in a fixed position extending radially into intersection with the throughbore. Thus, while the rod 46 is threaded in a correspondingly threaded aperture through the carrier 44, adjuster 22 may be constructed as any means for adjusting the height of the platen 18, or adjusting the spacing between the upper and lower platens 18, 12 in the closed position.

In one embodiment, the grip 49 includes a manual handle 54 in the form of a grippable knob locked for rotation with the rod 46 extending through the aperture in the arm 16. As shown in FIG. 5, the rod 46 of the adjuster 22 is formed as a spindle having a threaded portion 60 and an end portion 62 dimensioned to be received within an interior bore of the connector 50. The connector 50 includes an annular, exteriorly threaded body 66 and a hexagonal head 68. The threaded body 66 is received in a correspondingly threaded bore of a boss 70 on the upper platen 18. An enlarged shoulder 72 extends radially outwardly from the spindle between the spindle end 74 and the threaded portion 60. The bore of the body 66 has a diameter slightly greater than the diameter of the spindle end 74 and includes a chamfered upper end adjacent the head 68. The resulting annular space between the connector 50 and the spindle 64 permits swivel adjustment between the platen 18 threadedly engaged with the connector 50 and the spindle end 74 of the rod 46. The connector 50 is retained on the spindle 64 by a headed bolt 76 engaged in a correspondingly threaded bore 78 extending into the spindle end 74.

The other end of the rod 46 includes the stem 80 having a flat side 82 adapted to be received in a correspondingly shaped bore 84 in the grip 54. As a result, the upper platen 18 is relatively adjustable when transfers and apparel are inserted between the lower platen 12 and the upper platen 18 have disparity between or irregularity in thickness so as to exert substantially constant pressure to all of the components positioned between the platens. The alloy steel swivel bushing is coated to reduce wear and oxidation, for example, by chrome or nickel plating, particularly to reduce oxidation at pressing temperatures and a stainless steel bolt is likewise treated for similar purposes.

Figure 6:
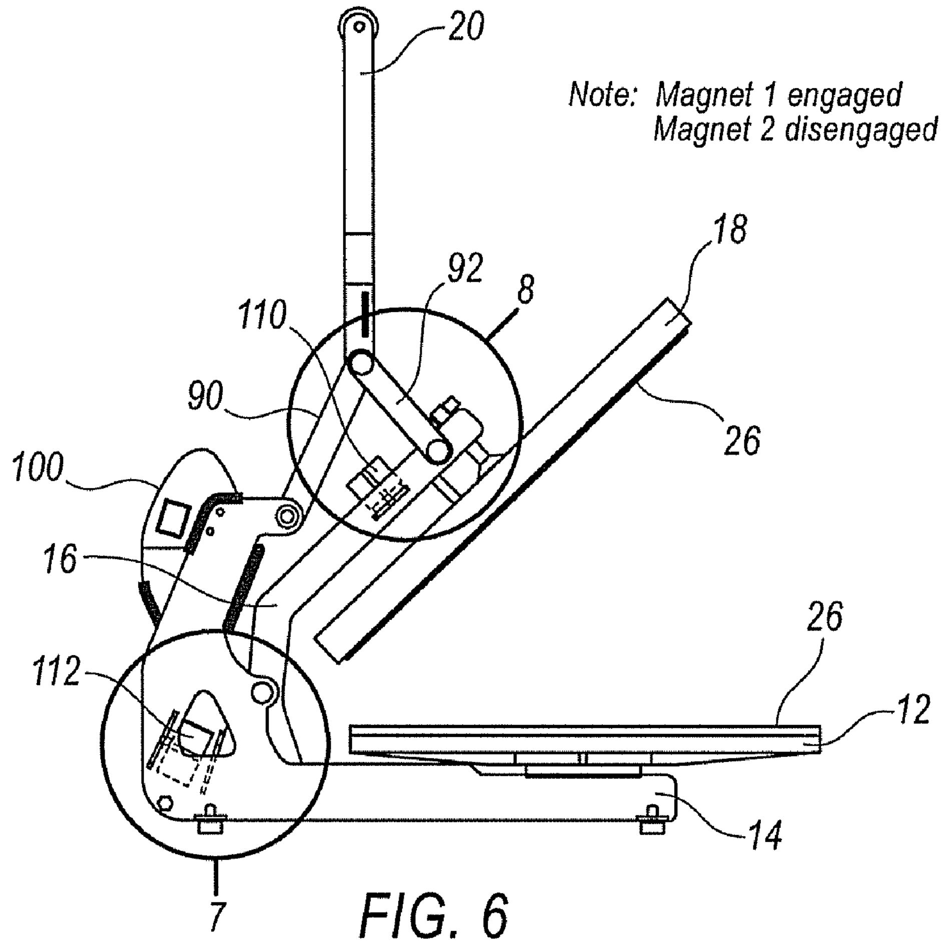
FIG. 6 is a side elevational view of the transfer press in FIG. 1 shown in an open position.
Figure 7:
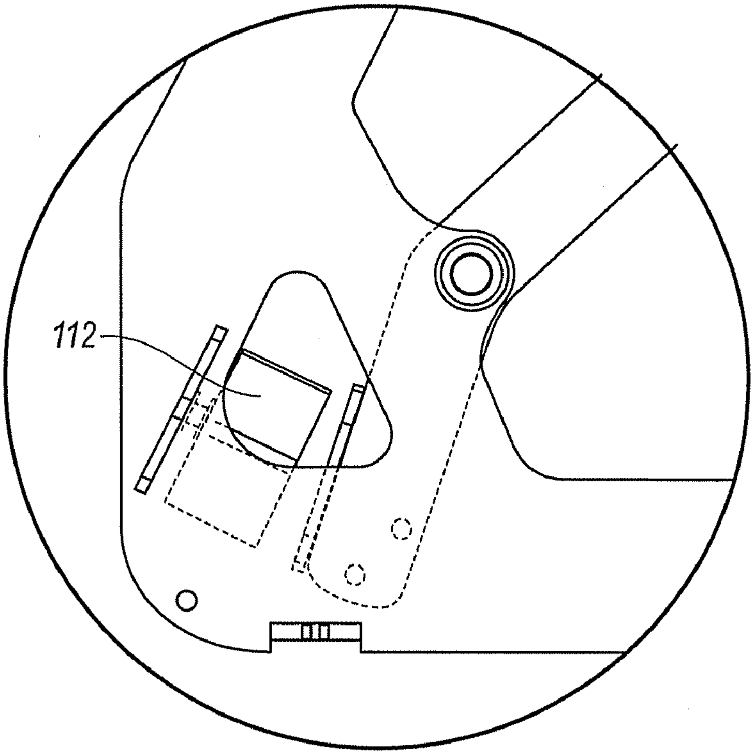
FIG. 7 is an exploded view of part of the device of FIG. 6 showing one embodiment of placement of an electromagnet.
Figure 8:
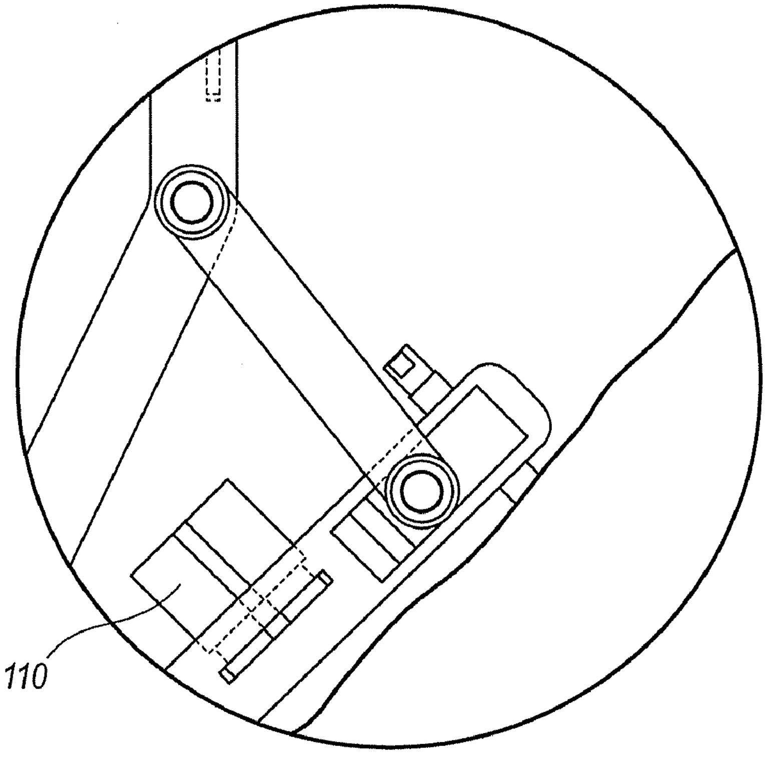
FIG. 8 is an exploded view of part of the device of FIG. 6 showing one embodiment of placement of an electromagnet.
Figure 9:
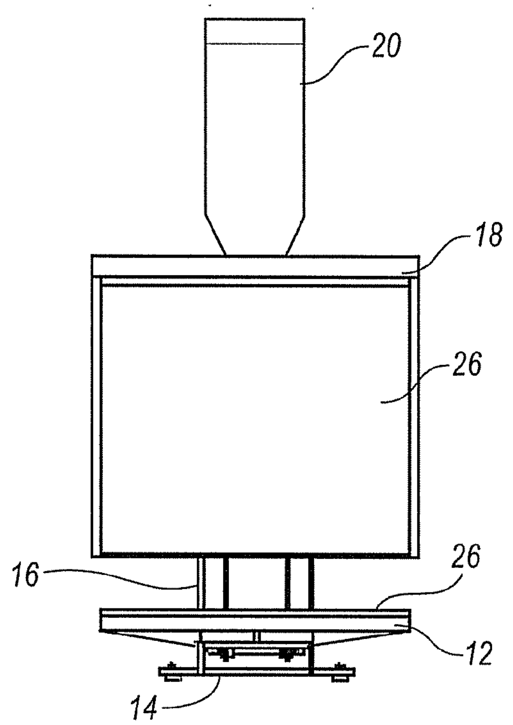
FIG. 9 is a front elevational view of the transfer press in FIG. 1 shown in an open position.
Figure 10:
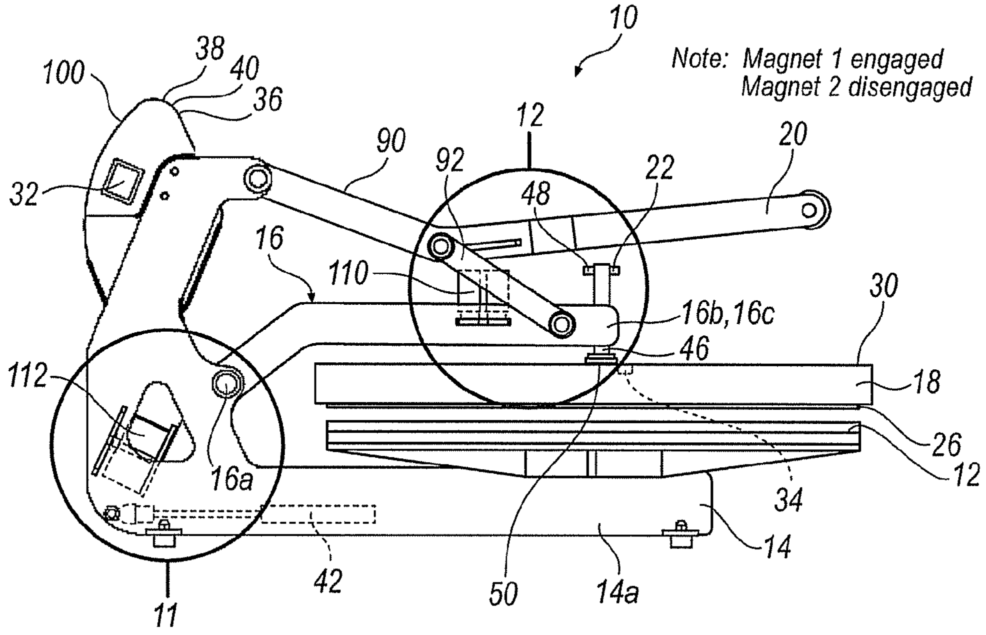
FIG. 10 is a side elevational view of the transfer press in FIG. 1 shown in a hover position.
Figure 11:
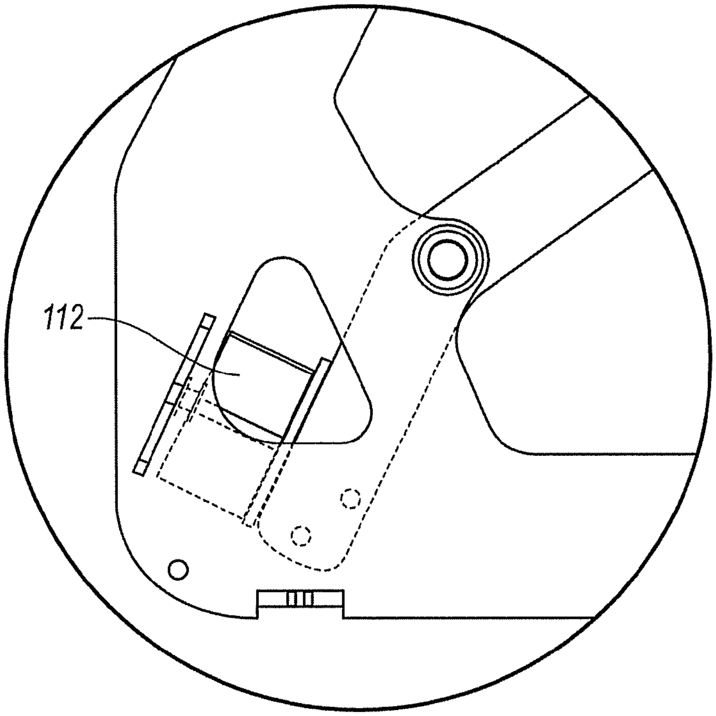
FIG. 11 is an exploded view of part of the device of FIG. 10 showing one embodiment of placement of an electromagnet.
Figure 12:
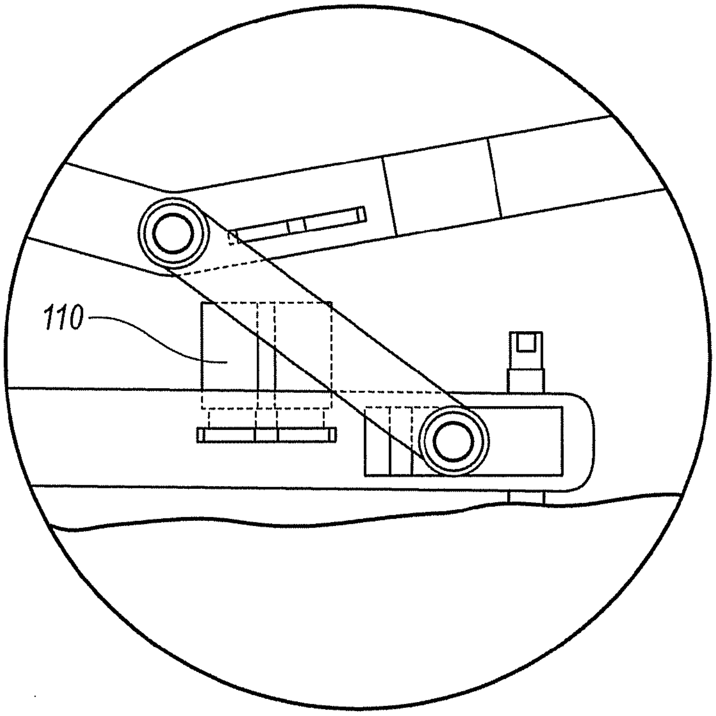
FIG. 12 is an exploded view of part of the device of FIG. 10 showing one embodiment of placement of an electromagnet.
Figure 13:
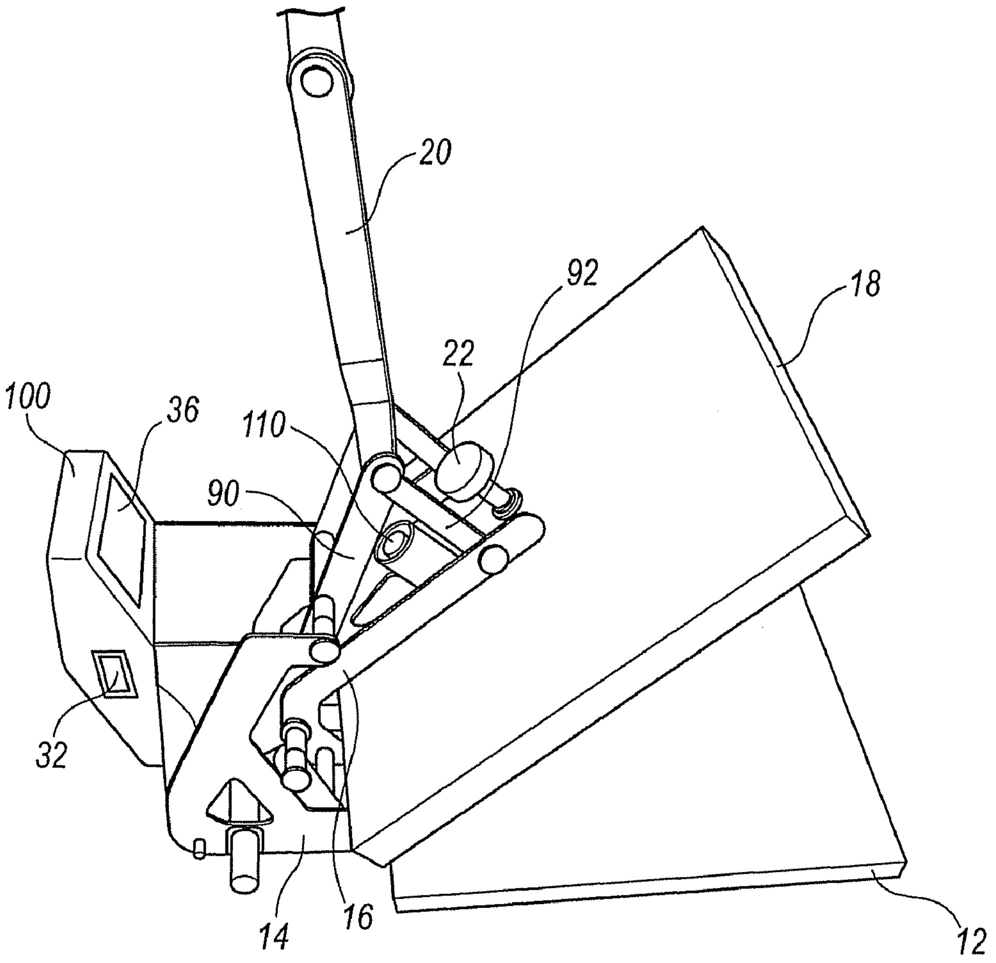
FIG. 13 is a top perspective view of the transfer press in FIG. 1.

In one embodiment, the adjuster 22 aligns the upper platen 18 substantially parallel to the lower platen 12 as the platen 18 moves from an open position as shown in FIG. 6 to a closed position, as shown in FIGS. 1 and 4. Proper registration of the surface areas of the platens 12, 18 is aided by guides 90, 92 as the gas springs 42 resiliently urge the support arm 16 toward the open position. The guides 90, 92 of one embodiment include the second guide 92 being secured to the operating arm 20 to align the upper platen 18 in proper registration over the lower platen 12, even during swiveling movement of the platen 18 about the connector 50.

The connector 50 positions the upper platen 18 in a substantially parallel alignment with a lower platen 12 as it approaches a closed position. Moreover, the closed position can be varied by the adjuster 22 that raises the level of the upper platen 18 with respect to the lower platen 12. As a result, regardless of the thickness of the material or the transfers to be applied or the thickness of support pads to be used between the platens, the alignment of the platens 18, 12 avoids uneven pinching of the material and the transfers positioned between the upper and lower platens 18, 12. Moreover, the pad 26 assist the pressure distribution regardless of irregularities in the thicknesses of the heat applied transfers and the apparel to which it is applied. Furthermore, the extended length of the operating arm 20 provides substantial leverage for ease in manually operating the press 10 to displace the platens 12 and 18 between the upper and lower positions, even during application and releasing of high pressure engagement between the platens 18, 12.

A control mechanism 100 for controlling the heat and duration of press closure when operating the mechanical apparatus described above is also provided. The control mechanism includes but is not limited to: an on/off switch 32 for selectively coupling a power source; a visual display 36; a data entry means 39; a thermostat 38; a thermocouple 34; proximity sensors 15 and 17 (not shown in the drawings); an audible alarm; a digital LED display indication XXX for use as a visual alarm; and a digital microprocessor based control with a resettable automatic timer to activate the audible and visual alarms. The switch 32 is coupled by conductors to the terminal strip, which is conveniently located, for example, on the back of frame member or stanchion upper platen 18, to couple the power source to a heating circuit. The visual display 36 provides an indication that the power is coupled to the control system and an indication that the power is coupled to the heating circuit. The visual display 36 also provides temperature information, upper platen 18 position information and timer counter display. The LED display is included to ease a worker's interface with the controls as will be described in greater detail.

Referring to FIGS. 1-4 and 6-9, one embodiment of the transfer press 10 includes a feature that when the power switch 32 has been plugged in, the control mechanism 100 initiates the press 10 in a standard operating mode. The standard operating mode includes having the temperature automatically set to a desired predetermined temperature and the closure duration predetermined such that at the end of the predetermined duration an indicator, for example an audible alarm, is activated. An electromagnet 110 enables the predetermined parameters of time and temperature to be executed and permits a worker's selective return to a modified transfer operation. In particular, full-range depression of the operating arm 20 enables the electromagnet 110 to hold the upper platen 18 depressed against the lower platen 12 for a predetermined time. In one embodiment, the user is provided with a visual indication of the temperature set mode by an illuminated set mode light, for example a yellow light, simultaneously with illumination of temperature light, for example, a red light. The visual indicator may also provide signaling that at least one of a predetermined temperature, a predetermined time, or a predetermined pressure has been achieved. Further, an audible indicator may also provide signaling that at least one of a predetermined temperature, a predetermined time, or a predetermined pressure has been achieved. In this mode of operation, the control mechanism 100 enables the user to decrease the platen temperature by setting a decrease control, for example, depressing the decrease button, or an increase control, for example, depressing the increase button.

Referring to FIGS. 1-4 and 6-13, another embodiment of the transfer press 10 includes a feature that when the power switch 32 has been plugged in, the control mechanism 100 initiates the press 10 in another standard operating mode. This standard operating mode includes having the temperature automatically set to a desired predetermined temperature for pre-curing while the upper platen 18 is in the hover position followed by having the temperature automatically adjusted to a desired predetermined temperature while the upper platen 18 is in the closed position. The predetermined closure duration at each step is completed before an indicator, for example an audible alarm, is activated. Two electromagnets enable the predetermined parameters of time and temperature to be executed at the appropriate platen 18 positions and permit a worker's selective return to a modified transfer operation. In particular, in one embodiment initial partial depression of the operating arm 20 enables the electromagnet 112 to hold the upper platen 18 in a hover position over the lower platen 12 for a predetermined time. A further depression of the operating arm 20 enables electromagnet 110 to hold the upper platen 18 depressed against the lower platen 12 in a closed position for a predetermined time. (this happens every other cycle not by the arm depressing further in the hover mode. The press mode and hover modes are two distinct modes alternating) In one embodiment, the user is provided with a visual indication of the time, temperature and position set modes as well as the timer count, for example a digital readout on the visual display 36. The visual indication may also provide signaling that at least one of a predetermined temperature, a predetermined time, or a predetermined pressure has been achieved. Further, an audible indicator may also provide signaling that at least one of a predetermined temperature, a predetermined time, or a predetermined position has been achieved. The control mechanism 100 could also enable the user to modify the predetermined sequence of temperature, position or time through the data entry means 39.

The desired combination of time, temperature and pressure at which heat applied transfer is properly accomplished is dependent upon the thickness of material, the type or composition of the adhesive or inks to be applied, and the style and composition of the lettering material or the apparel.

A proximity sensor detects when the upper platen 18 has been closed against the lower platen 12. The sensor initiates an input to the microprocessor for counting the duration previously set during the time adjustment mode of the control circuit and directs power to the electromagnet 110 for maintaining a closed position. The electromagnet 110 assists in a lock-down at the closed position. When the predetermined heating time has been completed, the electromagnet 110 releases the operating arm 20, placing the transfer press 10 in the open position. The gas springs 42 further assist in placing the press 10 in the open position by providing constant bias as described above between the support arm 16 and the base frame 14, biasing the support arm 16 in an upward direction.

A proximity sensor detects when the upper platen 18 has been closed to a partially open position above the lower platen 12. The sensor initiates an input to the microprocessor for counting the duration previously set during the time adjustment mode of the control circuit and directs power to the electromagnet 112 for maintaining a closed (partially open) position. The electromagnet 112 assists in a lock-down at the partially open hover position. When the predetermined heating time has been completed, the electromagnet 112 releases the support arm 16, placing the transfer press 10 in the open position. The gas springs 42 further assist in placing the press 10 in the open position by providing constant bias as described above between the support arm 16 and the base frame 14, biasing the support arm 16 in an upward direction.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A press comprising:

an upper platen;

a support arm adapted to selectively move said upper platen between an open position, a partially open position and a closed position;

an adjuster supporting said upper platen from said support arm, said adjuster configured to align said upper platen substantially parallel with a lower platen of the press, wherein pressure exerted by said upper platen upon the lower platen is substantially equalized across the face of said upper platen;

a first electromagnet in operational communication with said support arm and configured to selectively secure said upper platen in said closed position; and a second electromagnet in operational communication with said support arm and configured to selectively secure said upper platen in a partially open position.

2. The press of claim 1, further including at least one heating element in mechanical communication with said upper platen.

3. The press of claim 1, further including a lower platen disposed below and generally aligned with said upper platen and an operating arm in operational communication with said support arm wherein at least a portion of said operating arm is in selective magnetic communication with said first electromagnet.

4. The press of claim 3, wherein at least a portion of said support arm is in selective magnetic communication with said second electromagnet.

5. The press of claim 1, further including at least one gas spring disposed between said base of said press and said support arm adapted to bias said upper platen to said open position.

6. The press of claim 1, further including a visual indicator for signaling that at least one of a predetermined temperature, a predetermined time, and a predetermined pressure is achieved.

7. The press of claim 1, further including an audible indicator for signaling that at least one of a predetermined temperature, a predetermined time, and a predetermined pressure is achieved.

8. The press in claim 1, wherein said first electromagnet assists said support arm into said closed position.

9. The press in claim 1, wherein said second electromagnet assists said support arm into said partially open position.

10. The press in claim 1, further comprising a control system to set variable time, temperature and pressure combinations and to receive feedback on the said variable time, temperature and pressure combinations.

11. A press comprising:

a lower platen;

a base supporting the lower platen;

an upper platen disposed above said lower platen;

at least one heating element in mechanical communication with at least one of said upper platen and said lower platen;

a support arm pivotally coupled to said base about a first pivot axis and selectively moving said upper platen between any open position spaced apart from said lower platen and a closed position closely adjacent said lower platen;

an adjuster supporting said upper platen from said support arm, said adjuster configured to align said upper platen substantially parallel with said lower platen, wherein pressure exerted by said upper platen upon said lower platen is substantially equalized across the face of said upper platen;

a first electromagnet in operational communication with said support arm, said electromagnet being configured to selectively secure said upper platen in the closed position for a predetermined time;

a second electromagnet in mechanical communication with said base and in operational communication with said support arm, said electromagnet being configured to selectively secure said upper platen in a partially open position for a predetermined time; and an operating arm in operational communication with said support arm.

12. The press in claim 11, wherein said first electromagnet assists said support arm and said operating arm to the closed position.

13. The press in claim 11, wherein said second electromagnet assists said support arm and said operating arm to a partially open position.

14. The press in claim 11, further including at least one gas spring disposed between said base and said support arm biasing said upper platen from said closed position to said open position.

15. The press of claim 11, further including a visual indicator for signaling that at least one of a predetermined temperature, a predetermined time, and a predetermined pressure has been achieved.

16. The press of claim 11, further including an audible indicator for signaling that at least one of a predetermined temperature, a predetermined time, and a predetermined pressure has been achieved.

* * * * *